(12) United States Patent
Mityagin

(10) Patent No.: US 9,961,132 B2
(45) Date of Patent: May 1, 2018

(54) PLACING A USER ACCOUNT IN ESCROW

(71) Applicant: Dropbox, Inc., San Francisco, CA (US)

(72) Inventor: Anton Mityagin, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 0 days. days.

(21) Appl. No.: 14/446,707

(22) Filed: Jul. 30, 2014

(65) Prior Publication Data
US 2016/0036802 A1  Feb. 4, 2016

(51) Int. Cl.
*H04L 29/06* (2006.01)
*H04L 29/08* (2006.01)

(52) U.S. Cl.
CPC .............. *H04L 67/10* (2013.01); *H04L 63/08* (2013.01); *H04L 63/10* (2013.01)

(58) Field of Classification Search
CPC ....... H04L 63/083; H04L 67/10; H04L 63/08; H04L 63/10
USPC ............................................................. 726/5
See application file for complete search history.

(56) References Cited

U.S. PATENT DOCUMENTS

| | | | | |
|---|---|---|---|---|
| 2007/0198713 A1* | 8/2007 | Tsao | .................... | H04L 41/0253 709/225 |
| 2008/0034411 A1* | 2/2008 | Aoyama | ................ | G06F 21/305 726/5 |
| 2009/0025066 A1* | 1/2009 | Roytblat | ................. | G06F 21/34 726/5 |
| 2009/0300745 A1* | 12/2009 | Dispensa | ............ | H04L 63/0869 726/7 |
| 2010/0114641 A1* | 5/2010 | Coffman | ................ | G06Q 10/06 705/7.26 |

* cited by examiner

*Primary Examiner* — Hadi S Armouche
*Assistant Examiner* — Angela R Holmes
(74) *Attorney, Agent, or Firm* — DLA Piper LLP US

(57) ABSTRACT

Disclosed are systems, methods, and non-transitory computer-readable storage media for placing a user account in escrow to remove it from an administered account. An employee and/or an employer can select to remove a user account from an administered account associated with the employer. To ensure that the each party, the employer and employee, has an opportunity to retain their content stored in the removed user account, the user account can be placed into escrow, requiring login credentials of both the user and the administrator (employer) to access the user account. The user account can therefore not be accessed unless both the employer and employee each login to the account at the same time. By placing the user account in escrow, both parties can be assured that they can access the content items in the user account, and that the other party cannot access the content without their knowledge.

9 Claims, 5 Drawing Sheets

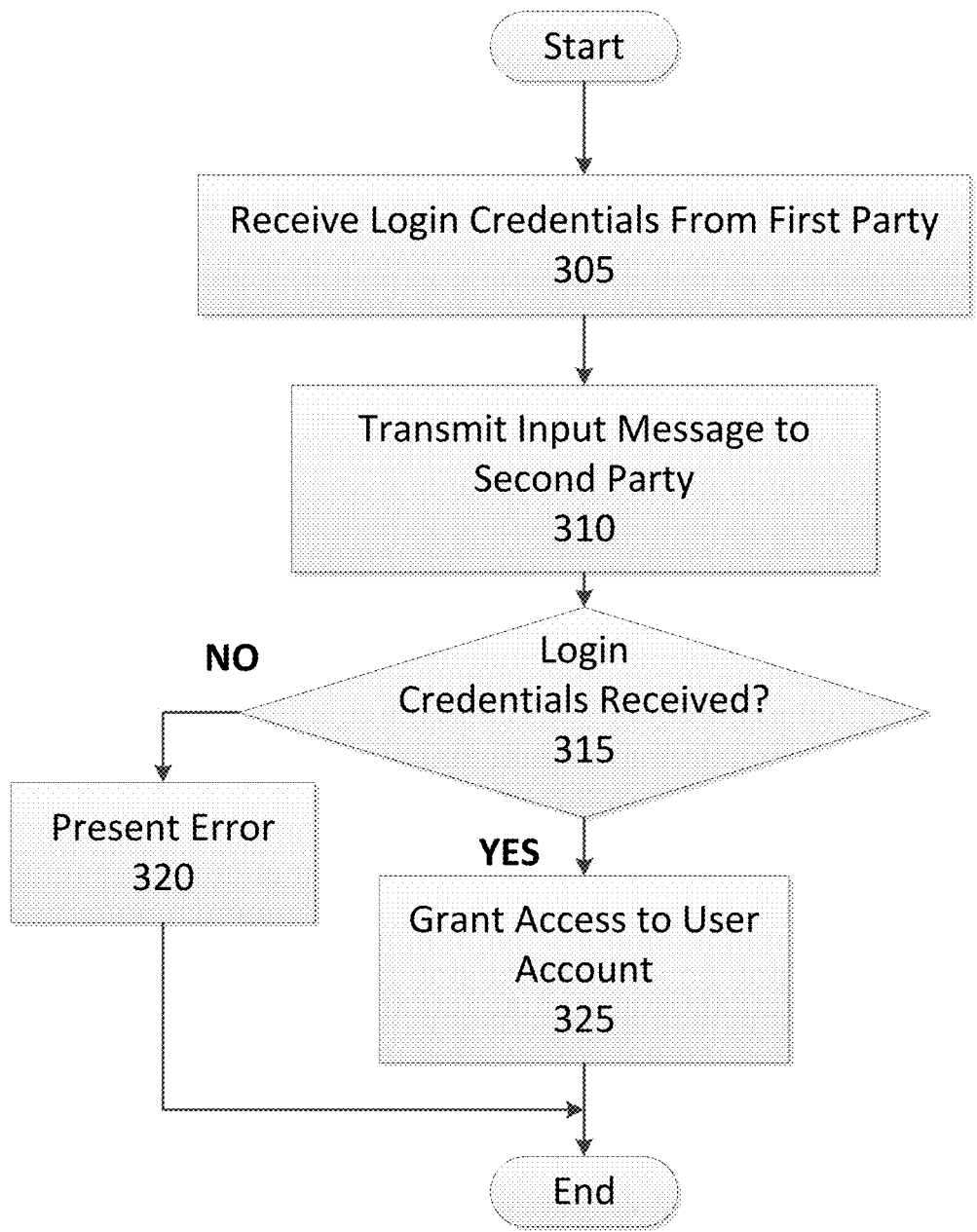

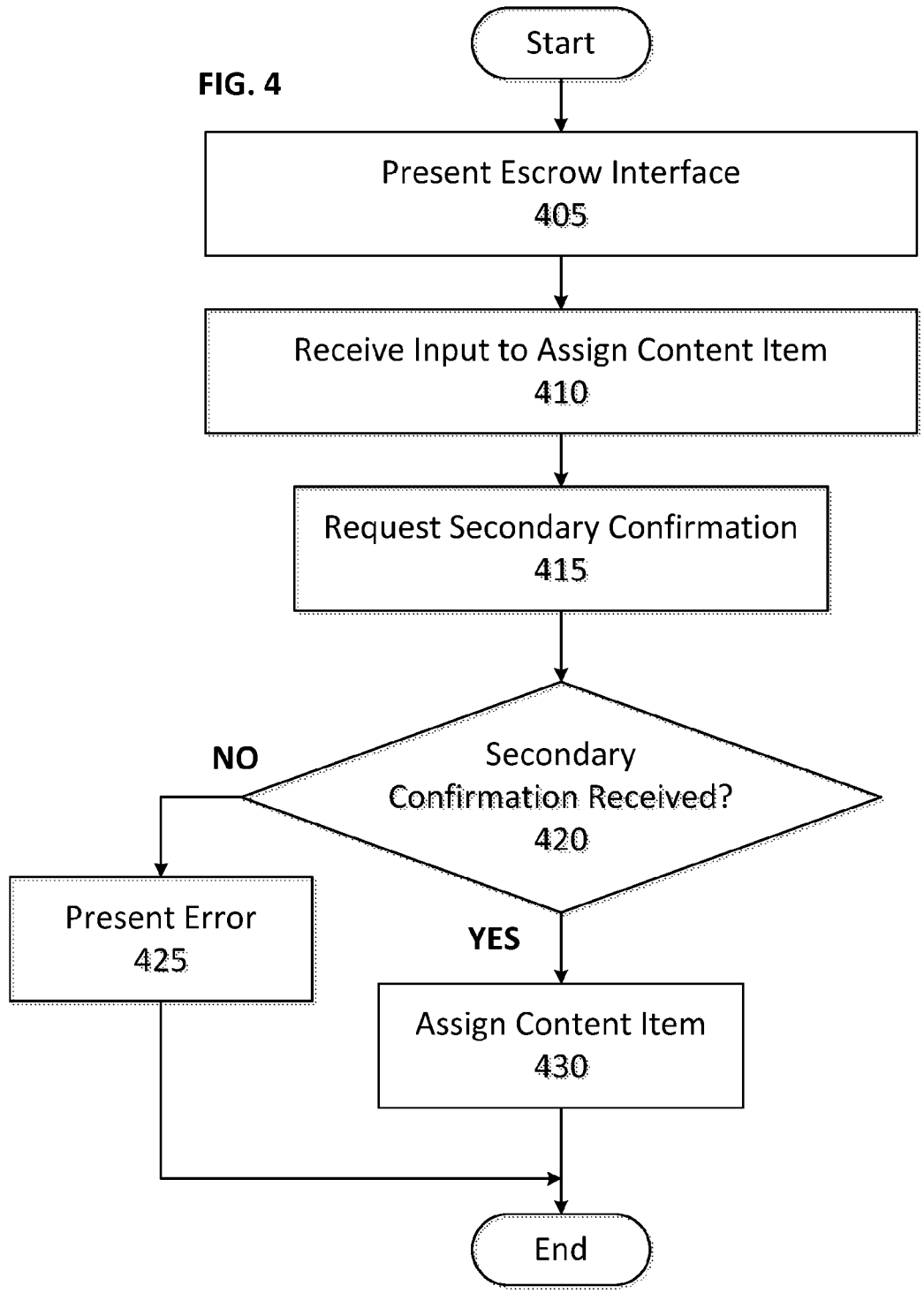

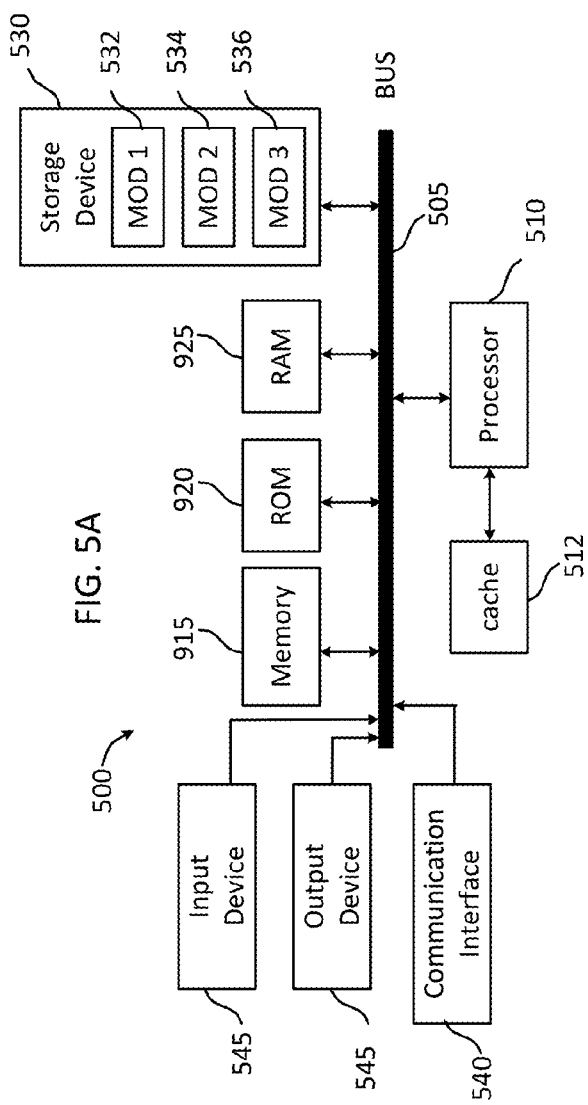
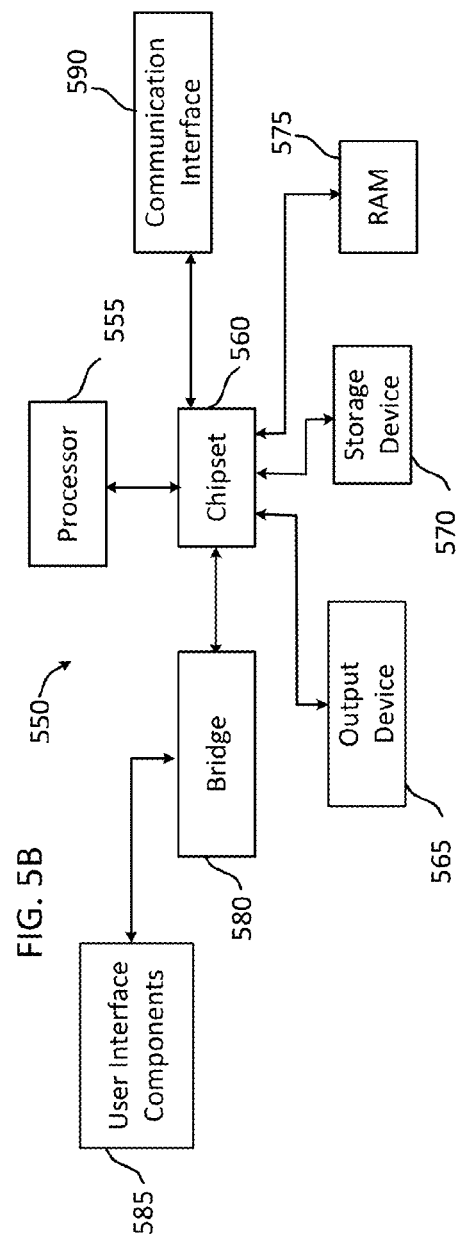
FIG. 5A
FIG. 5B

PLACING A USER ACCOUNT IN ESCROW

TECHNICAL FIELD

The present technology pertains to removing a user account from an administered account, and more specifically pertains to placing the user account in escrow.

BACKGROUND

Cloud storage accounts allow users to store their content items in an online user account that can be accessed from any computing device with a network connection. Users can thus upload content items such as pictures, songs, documents, etc. from a computing device to their online user account and later access the content items from different computing devices.

In addition to personal use, online user accounts can also be useful in a business setting. For example, numerous user accounts can be grouped together into a single administered account. Each of the grouped user accounts can be accessed by an employee associated with the user account as well as an administrator associated with the employer. The employer and employee can thus each access the user account to share content items with each other.

While sharing content item between and an employer and employees can be easy using an administered account, problems can arise when a user account must be removed from the administered account. For example, the user account must be assigned to either the employee or the employer, thus restricting one or the parties from accessing the content in the user account. As a result, each party must trust the other party to review the content items in the storage account and return any content items that should remain with the other party. For example, if the user account is assigned to the employee, the employer must trust the employee to return any content items stored in the user account that should remain with the employer. Likewise, if the user account is assigned to the employer, the employee must trust the employer to return any content items that are personal content items of the employee. Accordingly, an improved system is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for placing a user account in escrow to remove it from an administered account. An employee and/or an employer can select to remove a user account from an administered account associated with the employer. To ensure that the each party, the employer and employee, has an opportunity to retain their content stored in the removed user account, the user account can be placed into escrow, requiring login credentials of both the user and the administrator (employer) to access the user account. The user account can therefore not be accessed unless both the employer and employee each login to the account at the same time. By placing the user account in escrow, both parties can be assured that they can access the content items in the user account, and that the other party cannot access the content without their knowledge.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 shows an exemplary method embodiment of granting access to a user account placed in escrow;

FIG. 4 shows an exemplary method embodiment of managing content items in an escrow account; and FIGS. 5A and 5B show exemplary possible system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for placing a user account in escrow to remove it from an administered account. An employee and/or an employer can select to remove a user account from an administered account associated with the employer. To ensure that the each party, the employer and employee, has an opportunity to retain their content stored in the removed user account, the user account can be placed into escrow, requiring login credentials of both the user and the administrator (employer) to access the user account. The user account can therefore not be accessed unless both the employer and employee each login to the account at the same time. By placing the user account in escrow, both parties can be assured that they can access the content items in the user account, and that the other party cannot access the content without their knowledge.

Figure 1:
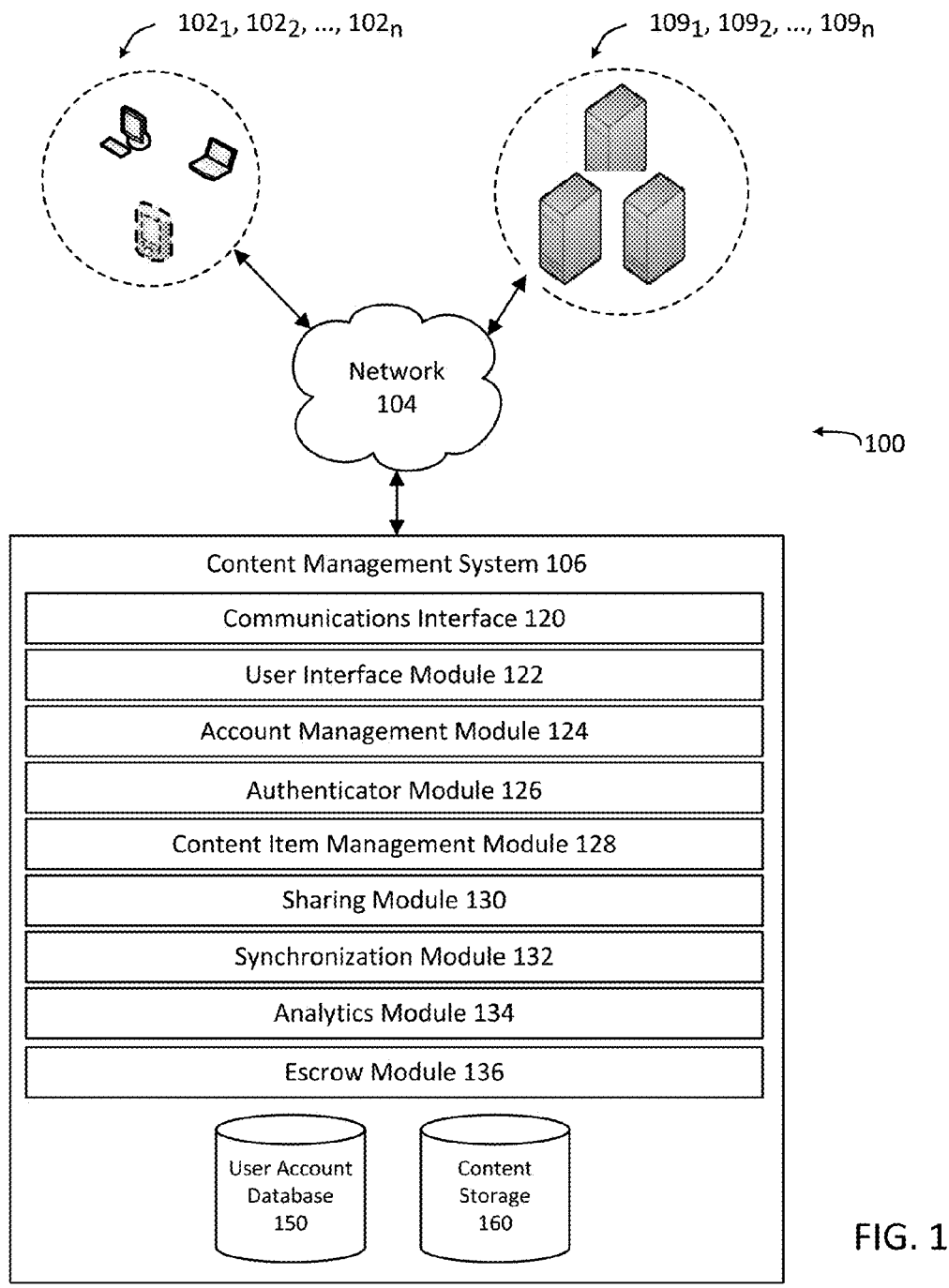
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true.

A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, in some embodiments, content management system 106 can be configured to place a user account in escrow when the user account is removed from an administered account.

An administered account can be a grouping of user accounts that can be accessed by an administrator of the administered account (i.e. the employer) as well as the respective employee associated with the user account. Thus, each of the user accounts in the administered account can be accessed using two distinct login credentials: the respective employee's login credential and an administrator login credential. This can result in both the employee and the administrator being able to access the user account at any time.

An employee and an employer can use the administered account to share content items by simply assigning the content items to the user account included in the administered account. Further, the employee can use the user account to store personal content items, resulting in the contents of the user account including both personal and work related content items. This mixture of personal and work related content items can become problematic if the user account is removed from the administered account. For example, the employer may wish to retain the work related content items, whereas the employee may wish to retain the personal content items.

To ensure that each party retains the ability to access the user account after it has been removed from the administered account, in some embodiments, the user account can be placed in escrow upon being removed from the administered account. Placing the user account in escrow can result in the login credentials of both the employee and the administrator being required to access the user account, rather than just the login credentials of either the employee or administrator. Thus, both the employer and the employee can still access the user account, however neither party can access the user account without the consent of the other party.

To accomplish this, content management system 106 can include escrow module 136 configured to place a user account into escrow. In some embodiments, escrow module 136 can be configured to place a user account in escrow upon receiving an escrow request requesting that a specified user account be placed into escrow. For example, an escrow request can be transmitted in response to an employee or employer selecting to remove the user account from an administered account. Further, the escrow request can include an account identifier identifying the user account to be placed in escrow.

Alternatively, in some embodiments, escrow module 136 can be configured to monitor administered accounts on content management system 106 and detect when a user account has been removed from an administered account.

Upon determining that a user account has been removed from an administered account, escrow module 136 can be configured to place the account in escrow. This can include modifying access to the user account to require the login credentials of both the employer and the employee to access the account.

To accomplish this, in some embodiments, escrow module 136 can mark the user account as being placed in escrow. For example, a user account can be associated with an account entry that identifies the user account and all users that can access the user account. For example, an account entry can included an account identifier that identifies the user account and user identifiers that identify each user that can access the user account. Further, each account entry can include an indication of whether the user account is or is not in escrow. For example, each account entry can include an escrow flag that indicates whether the user account has been placed into escrow.

Escrow module 136 can be configured to identify the account entry associated with the user account and modify the escrow flag to indicate that the account entry has been placed in escrow. For example, the escrow flag can be set to 1 to indicate that the user account is in escrow and the escrow flag can be set to 0 to indicate that the user account is not in escrow.

Upon placing the user account in escrow, the login credentials of both the employee and the administrator can be required to access the user account. For example. authenticator module 126 can be configured to identify that a user account is in escrow based on, for example, the current state of the escrow flag, and then require the login credentials of each user associated with the user account to access the user account.

To require the login credentials of both the employee and the administrator, in some embodiments, a login prompt requesting the login credentials of both the employee and the administrator can be presented. This type of embodiment can be useful when the employee and the administrator attempt to access the user account from a single computing device.

Alternatively, in some embodiments, the login credentials of the employee and the administrator can be received from multiple computing devices. For example, in some embodiments, this can be accomplished by requiring that the the login credentials of both the employee and the administrator be received within a predetermined amount of time of each other for access to the user account to be granted. Thus, after the login credential of one party is received, the login credential of the second party must be received within a predetermined amount of time for access to the user account to be granted. The employee and the administrator can thus enter their respective login credentials from different computing devices.

If the login credentials of the second party are not received within the predetermined period of time after receiving the login credentials of the first party, in some embodiments, the login credentials of both parties can again be required for access to the user account to be granted. For example, if the employee's login credentials are received and the administrator's login credentials are not received within a predetermined amount of time after receiving the employees login credentials, for example 5 minutes, the login credentials of the employee will again be required for access the user account to be granted. In this scenario, the user credentials of the administrator would be required as well to access the user account, however the employee credentials would have to be reentered for access to the user account to be granted.

In some embodiments, a login message can be transmitted to either the employee or administrator, notifying the respective party that the other party has attempted to access the user account. For example, upon receiving the login credentials from the employee, escrow module 136 can be configured to transmit the login message to the administrator that the employee has entered the employee's login credentials. The administrator can thus enter their login credentials to enable the employee to access the user account.

In some embodiments, the login message can alert a party to a remaining amount of time for the party to enter the respective party's login credentials to enable access to the user account. For example, upon receiving the login credentials of the administrator, a login message can be sent to the employee notifying the employee that the administrator has entered the administrator's login credentials to access the user account as well as a remaining amount of time the employee has to enter the employee's login credentials for access to the user account to be accessed. The employee can thus access the user account and enter their login credentials to enable both the employee and the administrator to access the user account.

In some embodiments, the input message can prompt the recipient of the input message to enter login credentials required to grant access to the user account. For example, upon received the login credentials of the employee, escrow module 136 can be configured to transmit an input message to the administrator that prompts the administrator for the administrator's login credentials. The administrator can thus enter their login credentials into the input message, which can then be transmitted back to content management system 106.

Upon receiving the login credentials of both the employee and the administrator, the administrator and the employee can both be granted access to the user account. The employee and the administrator can then manage the content items in the user account by, for example, moving the content items to a personal user account and/or an employer account.

Alternatively, in some embodiments, escrow module 136 can be configured to present the employee and the administrator with an escrow interface to manage the content items in the user account. For example, in some embodiments, the escrow interface can present the content items in the user account and enable the employee and the administrator to mark the content items as being either personal content items or work related content items.

Further, the escrow interface can enable the employee and the administrator to select a personal user account and an employer account to assign the content items. For example, the escrow interface can prompt the employee and the administrator to enter login credentials for the personal user account and the employee account. Upon completion of marking the content items as either work related content items or personal content items, the content items assigned as personal content items can be assigned to the personal user account and the content items marked as work related content items can be assigned to the employer account. Alternatively, in some embodiments, the escrow interface can present the personal user account and the employer account in addition to the user account, and the employee and the administrator can drag the content items into either the personal user account or the employee account.

In some embodiments, escrow module 136 can be configured to require secondary confirmation to assign a content item in the user account to another account, such as a personal user account or an employer account. In some embodiments, escrow module 136 can require secondary confirmation from one of either the employee or the administrator based on the account the content item is being assigned to. For example, secondary confirmation can be required from the administrator to assign a content item in the user account to a personal user account of the employee. Likewise, secondary confirmation can be required from the employee to assign a content item in the user account to an employer account of the employer. Alternatively, in some embodiments, secondary confirmation can be required form both the employee and the administrator to assign a content item to another account, such as a personal user account or an employer account.

In some embodiments, secondary confirmation can include receiving the login credentials of the employee and/or the administrator. For example, the employee and/or the employer can be prompted to enter their login credentials as secondary confirmation. Alternatively, in some embodiments, secondary confirmation can include receiving an input confirming the transaction. For example, the employee can be presented with a secondary confirmation message indicating that the employee is attempting to assign a content item in the user account to an employer account of the employer. The secondary confirmation message can further include a user interface element, such as a button, checkbox, etc., to confirm. The employee can then confirm assigning the content item to the employer account by selecting the user interface element. Alternatively, the secondary confirmation message can include a second user interface element that indicates that the transaction is not authorized. The employee can thus select the second user interface element to prevent the content item from being assigned to the employee account.

Figure 2:
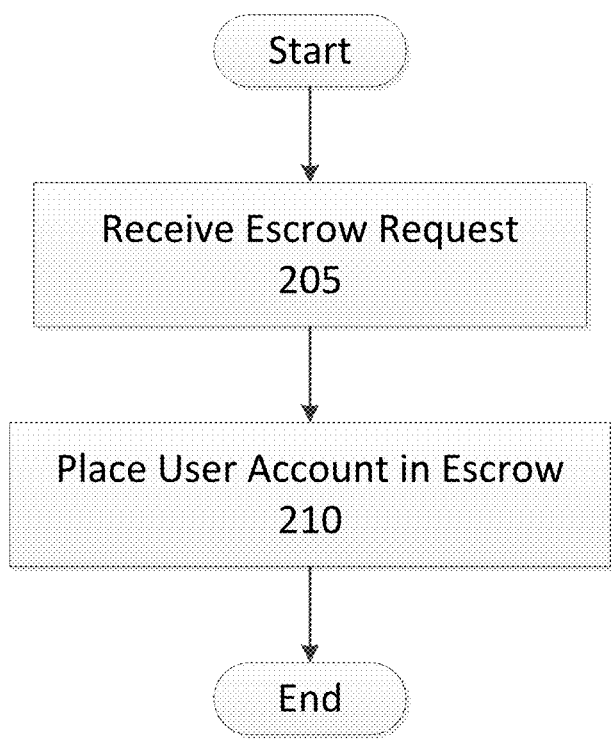
FIG. 2 shows an exemplary method embodiment of placing a user account into escrow.

FIG. 2 shows an exemplary method embodiment of placing a user account into escrow. Although specific steps are show in FIG. 2, in other embodiments a method can have more or less steps. As shown, the method begins at block 205 where an escrow request is received. An escrow request can be a request to place a specified user account into escrow. For example, an employee or employer requesting to remove a user account from an administered account associated with the employer, can result in an escrow account being received to place the user account in escrow.

In some embodiments, the escrow request can include an identifier identifying the user account to be placed in escrow. Upon receiving the escrow request, the method continues to block 210 where the user account identified by the escrow request can be placed in escrow. This can include editing an account entry associated with the user account to indicate that the user account has been placed in escrow. For example, an escrow flag associated with the account entry can be modified to indicate that the user account is in escrow.

Placing the user account in escrow can result in the login credentials of both the employee and the employer being required to grant access to the user account. Upon placing the user account in escrow, the method ends.

FIG. 3 shows an exemplary method embodiment of granting access to a user account placed in escrow. Although specific steps are show in FIG. 3, in other embodiments a method can have more or less steps. As shown, the method begins at block 305 where login credentials of a first party are received. The first party can be either the employee or the employer associate with the user account placed in escrow.

Upon receiving the login credentials of the first party, the method continues to block 310 where an input message is transmitted to the second party. The second party can be the party, either the employer or the employee, that login credentials have not yet been received from. For example, if the first party is the employee, the second party can be the employer and vice versa.

The input message can be a message alerting the second party that login credentials have been received from the first party and that login credentials of the second party are required for access to the user account to be granted. In some embodiments, the input message can prompt the second party to enter their login credentials.

Upon transmitting the input message to the second party, the method continues to block 315 where it is determined if the login credentials of the second party are received. If the login credentials of the second party are received, the method continues to block 325 where access to the user account is granted to the first and second party. If at block the login credentials of the second party are not received, the method continues to block 320 where an error message is presented to the first user. This can include a message indicating that access to the user account is denied because the login credentials of the second party were not received. The method then ends.

FIG. 4 shows an exemplary method embodiment of managing content items in an escrow account. Although specific steps are show in FIG. 4, in other embodiments a method can have more or less steps. As shown, the method begins at block 405 where an escrow interface is presented to the employee and the employer. An escrow interface can be an interface configured to enable the employee and the employer to manage the content items in the user account, for example, by selecting a target account for the content items. For example, the content items can be assigned to a personal user account associated with the employee or an employer account associated with the employer.

The method then continues to block 410 where input to assign a content item to either the personal user account or the employer account. Upon receiving the input, the method continues to block 415 where secondary confirmation is requested. Secondary confirmation can be confirmation that assigning the content item to the selected account, either the personal user account or the employer account, is authorized parties. For example, upon receiving an input to assign a content item to the personal user account, secondary confirmation can be requested from the employer to ensure that the employer approved the content item being assigned to the personal user account.

At block 420, the method determines if secondary confirmation is received. If at block 420, secondary confirmation is received, the method continues to block 430 where the content item is assigned to the selected account, either the personal user account or the employee account. Alternatively, if at block 420, secondary confirmation is not received, the method continues to block 425 where an error message is presented. This can include a message indicating that the content item cannot be assigned to the selected user account because secondary confirmation was not received. The method then ends.

FIG. 5A, and FIG. 5B show exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, by a computer processor, a removal request to remove a user account from an administered account associated with a first party and a second party, wherein the user account can be accessed using either first login credentials associated with the first party or second login credentials associated with the second party, and wherein the first login credentials are different from the second login credentials;
placing, by the computer processor, the user account in escrow;
granting, by the computer processor, access to the user account placed in escrow upon receiving both the first login credentials associated with the first party and the second login credentials associated with the second party;
receiving an assignment request to assign a content item in the user account placed in escrow to a first alternate user account associated with the first party;
requesting, from the second party, secondary confirmation to assign the content item to the first alternate user account associated with the first party; and
upon receiving secondary confirmation, assigning the content item to the first alternate user account associated with the first party.

2. The method of claim 1, further comprising:
when the second login credentials of the second party are not received, denying the first party access to the user account placed in escrow.

3. The method of claim 1, further comprising:
transmitting an access message to the second party, the access message requesting the second login credentials of the second party.

4. A system comprising:
a computer processor; and
a memory containing instructions that, when executed, cause the computer processor to:
receive a removal request to remove a user account from an administered account associated with a first party and a second party, wherein the user account can be accessed using either first login credentials associated with the first party or second login credentials associated with the second party, and wherein the first login credentials are different from the second login credentials;
place the user account in escrow;
grant access to the user account placed in escrow upon receiving both the first login credentials associated with the first party and the second login credentials associated with the second party;

receive an assignment request to assign a content item in the user account placed in escrow to a first alternate user account associated with the first party;

request, from the second party, secondary confirmation to assign the content item to the first alternate user account associated with the first party; and upon receiving secondary confirmation, assign the content item to the first alternate user account associated with the first party.

5. The system of claim 4, wherein the instructions further cause the computer processor to:

when the second login credentials of the second party are not received, deny the first party access to the user account placed in escrow.

6. The system of claim 4, wherein the instructions further cause the computer processor to:

transmit an access message to the second party, the access message requesting the second login credentials of the second party.

7. A non-transitory computer-readable medium containing instructions that, when executed by a computer processor, cause the computer processor to:

receive a removal request to remove a user account from an administered account associated with a first party and a second party, wherein the user account can be accessed using either first login credentials associated with the first party or second login credentials associated with the second party, and wherein the first login credentials are different from the second login credentials;

place the user account in escrow;

grant access to the user account placed in escrow upon receiving both the first login credentials associated with the first party and the second login credentials associated with the second party;

receive an assignment request to assign a content item in the user account placed in escrow to a first alternate user account associated with the first party;

request, from the second party, secondary confirmation to assign the content item to the first alternate user account associated with the first party; and upon receiving secondary confirmation, assign the content item to the first alternate user account associated with the first party.

8. The non-transitory computer-readable medium of claim 7, wherein the instructions further cause the computer processor to:

when the second login credentials of the second party are not received, deny the first party access to the user account placed in escrow.

9. The non-transitory computer-readable medium of claim 7, wherein the instructions further cause the computer processor to:

transmit an access message to the second party, the access message requesting the second login credentials of the second party.

* * * * *